US008643637B2

(12) United States Patent
Lee et al.

(10) Patent No.: US 8,643,637 B2
(45) Date of Patent: Feb. 4, 2014

(54) DC-DC CONVERTER AND MOBILE COMMUNICATION TERMINAL USING THE SAME

(75) Inventors: Yoon-Young Lee, Yongin (KR); Sung-Cheon Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 246 days.

(21) Appl. No.: 13/247,897

(22) Filed: Sep. 28, 2011

(65) Prior Publication Data
US 2012/0176361 A1 Jul. 12, 2012

(30) Foreign Application Priority Data
Jan. 6, 2011 (KR) .................. 10-2011-0001418

(51) Int. Cl.
G09G 5/00 (2006.01)
G06F 3/033 (2013.01)

(52) U.S. Cl.
USPC ........................... 345/212; 345/211; 323/299

(58) Field of Classification Search
USPC .................. 345/156, 204, 211, 212; 323/299; 713/300
See application file for complete search history.

(56) References Cited

U.S. PATENT DOCUMENTS

| | | | | |
|---|---|---|---|---|
| 3,590,361 A * | 6/1971 | Bishop et al. | ............ | 363/21.18 |
| 4,124,884 A * | 11/1978 | Episcopo | ............ | 363/21.08 |
| 4,210,958 A * | 7/1980 | Ikenoue et al. | ............ | 363/124 |
| 6,424,130 B1 * | 7/2002 | Fukui | ............ | 323/282 |
| 6,466,188 B1 * | 10/2002 | Cato | ............ | 345/82 |
| 8,134,548 B2 * | 3/2012 | Schrom et al. | ............ | 345/211 |
| 8,369,542 B2 * | 2/2013 | Noro et al. | ............ | 381/120 |
| 8,411,077 B2 * | 4/2013 | Park | ............ | 345/212 |
| 8,487,924 B2 * | 7/2013 | Jin et al. | ............ | 345/212 |
| 2002/0015033 A1 * | 2/2002 | Kim | ............ | 345/204 |
| 2003/0043090 A1 * | 3/2003 | Yazawa et al. | ............ | 345/76 |
| 2005/0259456 A1 * | 11/2005 | Chiang | ............ | 363/146 |
| 2006/0208719 A1 * | 9/2006 | Librizzi | ............ | 323/288 |
| 2007/0091036 A1 * | 4/2007 | Han et al. | ............ | 345/82 |
| 2007/0204178 A1 * | 8/2007 | Nishigata | ............ | 713/300 |
| 2007/0273351 A1 * | 11/2007 | Matan | ............ | 323/299 |
| 2008/0165167 A1 * | 7/2008 | Hong et al. | ............ | 345/204 |
| 2009/0085901 A1 * | 4/2009 | Antony | ............ | 345/211 |
| 2009/0102779 A1 * | 4/2009 | Jo | ............ | 345/101 |
| 2009/0179655 A1 * | 7/2009 | Trenchs Magana et al. | ............ | 324/537 |
| 2009/0224732 A1 * | 9/2009 | Kudo et al. | ............ | 323/271 |
| 2010/0060254 A1 * | 3/2010 | Tokura et al. | ............ | 323/299 |

(Continued)

FOREIGN PATENT DOCUMENTS

| | | | |
|---|---|---|---|
| EP | 2151912 A1 * | 2/2010 | |
| KR | 10-2006-0064543 A | 6/2006 | |
| KR | 10-0732851 B1 | 6/2007 | |
| KR | 10-2009-0050318 A | 5/2009 | |

Primary Examiner — Joe H Cheng
(74) Attorney, Agent, or Firm — Christie, Parker & Hale, LLP

(57) ABSTRACT

A DC-DC converter for converting an input power to generate a first power and for outputting the first power to a first output terminal, the DC-DC converter including: a resistor unit for electrically connecting a set resistor to the first output terminal when the voltage of input power is in a specific range, and a mobile communication terminal using the same. Here, the DC-DC converter is capable of reducing or removing a pulse skip mode by increasing a load of an output end if it is determined that the voltage of the input power is in the specific range, by sensing the input power.

8 Claims, 2 Drawing Sheets

(56) References Cited

U.S. PATENT DOCUMENTS

| | | | |
|---|---|---|---|
| 2010/0123693 A1* | 5/2010 | Utsunomiya | 345/205 |
| 2011/0187697 A1* | 8/2011 | Yun et al. | 345/212 |
| 2011/0273111 A1* | 11/2011 | Park | 315/294 |
| 2011/0273422 A1* | 11/2011 | Park | 345/211 |
| 2012/0155127 A1* | 6/2012 | Brokaw | 363/49 |
| 2013/0002639 A1* | 1/2013 | Park | 345/212 |
| 2013/0002736 A1* | 1/2013 | Park | 345/691 |

* cited by examiner

DC-DC CONVERTER AND MOBILE COMMUNICATION TERMINAL USING THE SAME

CROSS-REFERENCE TO RELATED APPLICATION

This application claims priority to and the benefit of Korean Patent Application No. 10-2011-0001418, filed on Jan. 6, 2011, in the Korean Intellectual Property Office, the entire content of which is incorporated herein by reference.

BACKGROUND

1. Field

The following description relates to a DC-DC converter and a mobile communication terminal using the same, and more particularly, to a DC-DC converter capable of reducing or removing a pulse skip mode by increasing a load of an output terminal when a voltage of an input power is in a specific range and a mobile communication terminal using the same.

2. Description of Related Art

With the development of a mobile communication field, a mobile communication terminal (such as a smart phone, etc.) has been prevalently distributed. The mobile communication terminal includes a display unit to display images.

Power needed to drive the display unit is transferred from a DC-DC converter. The DC-DC converter uses a pulse width modulation (PWM) to boost or reduce battery power in order to convert the power into DC power desired at a load side and to supply the DC power.

Since how long the battery is used in an available range is important, the DC-DC converter is operated as a pulse skip mode (PSM) in order to increase efficiency by removing a switching operation performed when a user interface (UI) screen having low driving voltage, or the like is displayed on the display unit.

However, when a call is made during the pulse skip mode, the battery power is unstably fluctuated and a flicker phenomenon occurs in the display unit. The problem is more of an issue in the case of a terminal using, e.g., a global system for mobile communication (GSM) scheme, that is a digital mobile communication scheme.

SUMMARY

Aspects of embodiments of the present invention are directed toward a DC-DC converter capable of reducing or removing a pulse skip mode by increasing a load of an output terminal if it is determined that an voltage of an input power is in a specific range by sensing the input power and a mobile communication terminal using the same.

According to an exemplary embodiment of the present invention, a DC-DC converter converting an input power to generate a first power and outputting the first power to a first output terminal includes: a resistor unit electrically connecting a set or predetermined resistor to the first output terminal when a voltage of the input power is in a specific range.

The DC-DC converter may further include: a boost circuit boosting the input power to generate the first power and outputting the first power to the first output terminal; and a buck circuit bucking the input power to generate a second power and outputting the second power to a second output terminal.

The resistor unit may include: the set resistor; a switching element disposed between the set resistor and the first output terminal; and a comparator turning-on the switching device when the voltage of the input power is larger than the reference voltage, and turning-off the switching element when the voltage of the input power is lower than the reference voltage.

The reference voltage may be 4.0V.

The input power may be transferred from a battery.

According to another exemplary embodiment of the present invention, a mobile communication terminal includes: a display unit for displaying images, the display unit including scan lines, data lines crossing the scan lines, and pixels at crossing regions of the scan lines and the data lines, the pixels being connected to both a first power supply and a second power supply; a scan driver supplying scan signals to the pixels through the scan lines; a data driver supplying data signals to the pixels through the data lines; and a DC-DC converter converting an input power to generate a first power of the first power supply and a second power of the second power supply and outputting the first power to a first output terminal and the second power to a second output terminal, wherein the DC-DC converter includes a resistor unit electrically connecting a set or predetermined resistor to the first output terminal when a voltage of the input power is in a specific range.

The DC-DC converter may include: a boost circuit boosting the input power to generate the first power and outputting the first power to the first output terminal; and a buck circuit bucking the input power to generate the second power and outputting the second power to the second output terminal.

The resistor unit may include: the set resistor; a switching element disposed between the set resistor and the first output terminal; and a comparator turning-on the switching device when the voltage of the input power is larger than the reference voltage, and turning-off the switching element when the voltage of the input power is lower than the reference voltage.

The reference voltage may be 4.0V.

The input power may be transferred from a battery.

As set forth above, in an exemplary embodiment of the present invention, the DC-DC converter is capable of reducing or removing the pulse skip mode by increasing the load of the output terminal if it is determined that the voltage of the input power is in the specific range, by sensing the input power.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
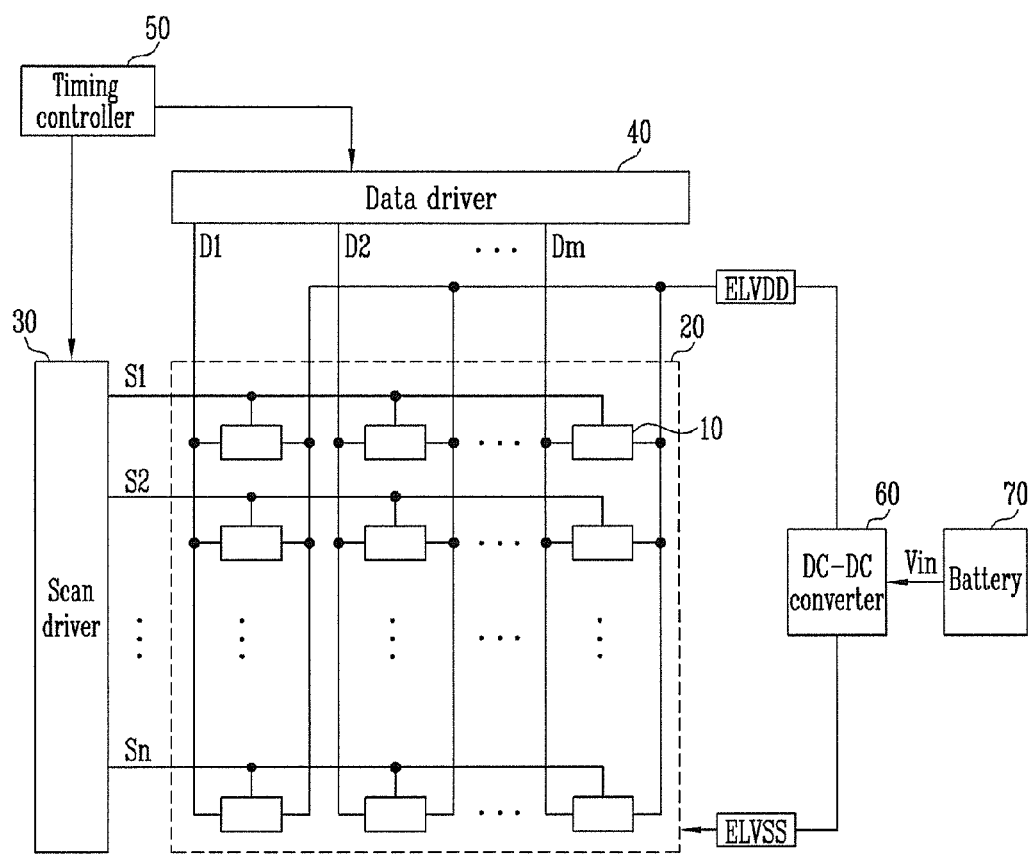
FIG. 1 is a diagram showing a mobile communication terminal including a DC-DC converter according to an exemplary embodiment of the present invention.

Hereinafter, certain exemplary embodiments according to the present invention will be described with reference to the accompanying drawings. Here, when a first element is described as being coupled to a second element, the first element may be not only directly coupled to the second element, but may also be indirectly coupled to the second element via one or more third elements. Further, some of the elements that are not essential to the complete understanding of the invention are omitted for clarity. Also, like reference numerals refer to like elements throughout.

Hereinafter, exemplary embodiments of the present invention will be described with reference to the accompanying drawings.

FIG. 1 is a diagram showing a mobile communication terminal including a DC-DC converter according to an exemplary embodiment of the present invention. In particular, FIG. 1 shows a display unit 20 related to the subject matter of the present invention and components related to a DC-DC converter 60, but other components included in a mobile communication terminal are known, and therefore they are not shown in FIG. 1 and will be omitted in the following description.

In addition, the mobile communication terminal may be a cellular phone, a smart phone, etc., that uses a mobile communication network.

Figure 2:
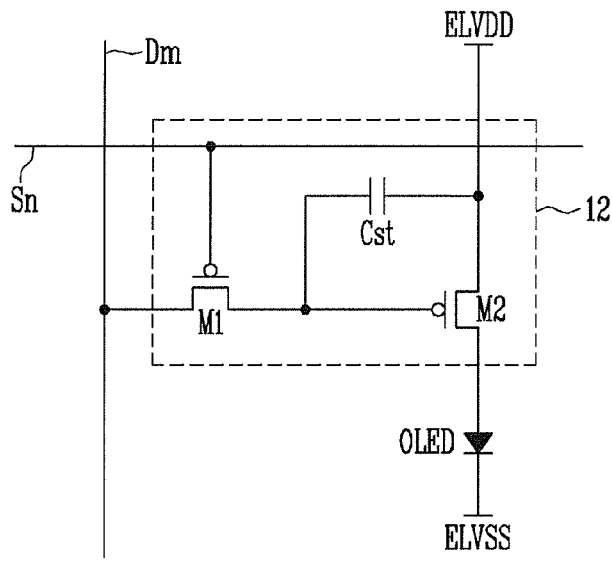
FIG. 2 is a diagram showing a pixel of a display unit according to the exemplary embodiment of the present invention.

FIG. 2 is a diagram showing a pixel of a display unit according to the exemplary embodiment of the present invention. In particular, FIG. 2 shows pixels connected to an n-th scan line Sn and an m-th data line Dn.

The mobile communication terminal according to the exemplary embodiment of the present invention is configured to include a display unit 20, a scan driver 30, a data driver 40, and a DC-DC converter 60. In addition, the mobile communication terminal may further include a timing controller for controlling the scan driver 30 and the data driver 40.

The display unit 20 displays various screens such as a user interface image (UI) on the mobile communication terminal. In the exemplary embodiment of the present invention, the display unit 20 may be an organic light emitting display.

In addition, the display unit 20 is formed of a plurality of pixels 10 connected to scan lines S1 to Sn and data lines D1 to Dm. In addition, each pixel 10 is connected to a first power supply ELVDD and a second power supply ELVSS, and each of pixel 10 supplied with a first power ELVDD' of the first power supply ELVDD and a second power ELVSS' of the second power supply ELVSS, generates light corresponding to data signals in accordance with the current flowing to the second power supply ELVSS from the first power supply ELVDD via an organic light emitting diode.

Referring to FIG. 2, each pixel 10 includes an organic light emitting diode (OLED) and a pixel circuit 12 connected to the data line Dm and the scan line Sn to control the organic light emitting diode (OLED).

An anode electrode of the organic light emitting diode (OLED) is connected to the pixel circuit 12, and a cathode electrode thereof is connected to the second power supply ELVSS.

The above-mentioned organic light emitting diode (OLED) generates light having set or predetermined luminance corresponding to current supplied from the pixel circuit 12.

The pixel circuit 12 controls the amount of current supplied to the organic light emitting diode (OLED) in accordance with the data signals supplied to the data line Dm when the scan signals are supplied to the scan line Sn. To this end, the pixel circuit 12 is configured to include a second transistor M2 connected between the first power supply ELVDD and the organic light emitting diode OLED, a first transistor M1 connected between the second transistor M2 and the data line Dm and is controlled by the scan line Sn, and a storage capacitor Cst connected between the gate electrode and the first electrode of the second transistor M2.

Here, the gate electrode of the first transistor M1 is connected to the scan line Sn, and the first electrode is connected to the data line Dm. The second electrode of the first transistor M1 is connected to one terminal of the storage capacitor Cst. In this configuration, the first electrode is set as any one of a source electrode and a drain electrode, and the second electrode is set as an electrode different from the first electrode. For example, when the first electrode is set as the source electrode, the second electrode is set as the drain electrode.

The first transistor M1 connected to the scan line Sn and the data line Sm supplies the data signal supplied from the data line Dm to the storage capacitor Cst when the scan signal is supplied from the scan line Sn. In this case, the storage capacitor Cst charges the voltage corresponding to the data signal.

The gate electrode of the second transistor M2 is connected to one terminal of the storage capacitor Cst, and the first electrode of the second transistor M2 is connected to other terminal of the storage capacitor Cst and the first power supply ELVDD. The second electrode of the second transistor M2 is connected to the anode electrode of the organic light emitting diode (OLED).

The second transistor M2 controls the amount of current flowing to the second power supply ELVSS from the first power supply ELVDD via the organic light emitting diode OLED corresponding to the voltage value stored in the storage capacitor Cst. In this case, the organic light emitting diode (OLED) generates light corresponding to the amount of current supplied from the second transistor M2.

The above-mentioned pixel structure of FIG. 2 is only the exemplary embodiment of the present invention, and the pixel 10 of the present invention is not limited to the pixel structure of FIG. 2.

The scan driver 30 generates the scan signals by the control of the timing controller 50 and supplies the generated scan signals to the scan lines S1 to Sn.

The data driver 40 generates the data signals by the control of the timing controller 50 and supplies the generated data signals to the data lines D1 to Dm.

Figure 3:
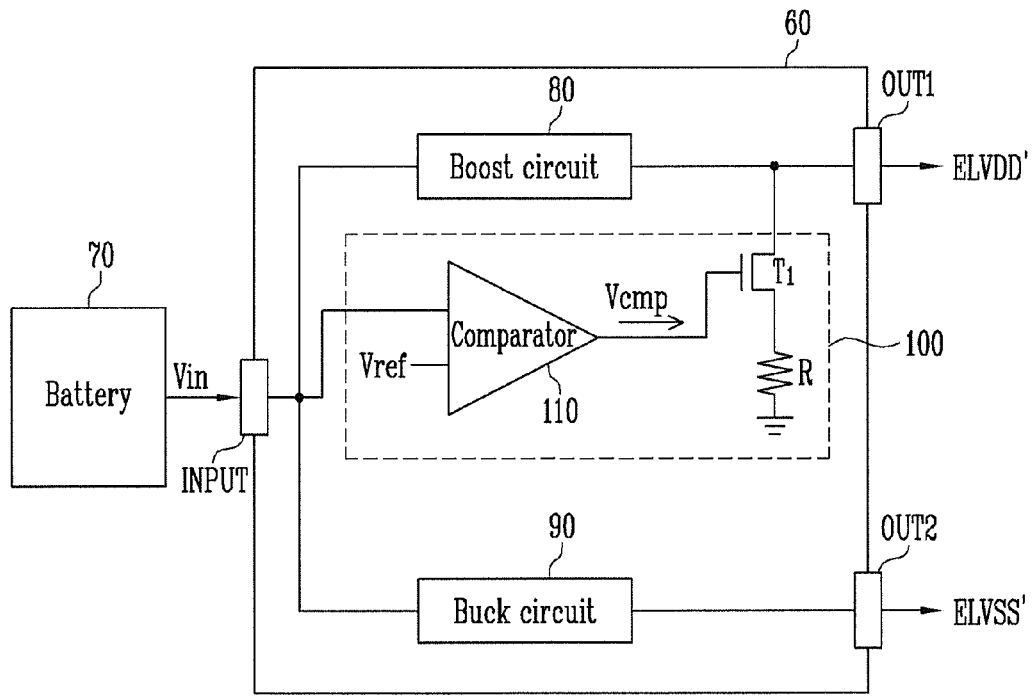
FIG. 3 is a diagram showing the DC-DC converter according to the exemplary embodiment of the present invention.

FIG. 3 is a diagram showing the DC-DC converter according to the exemplary embodiment of the present invention.

The DC-DC converter 60 converts input power Vin and generates the first power ELVDD' of the first power supply ELVDD and the second power ELVSS' of the second power supply ELVSS and supplies them to the display unit 20.

In particular, the DC-DC converter 60 includes a resistor unit 100 electrically connecting a set or predetermined resistor R to a first output terminal OUT1 from which the first power ELVDD' is output, when the input power Vin has the voltage of the specific range.

Therefore, when the voltage of the input power Vin is in the specific range and when a call is placed during the pulse skip mode, the flicker phenomenon occurring in the display unit 20 may be removed by changing the pulse skip mode into either a discontinuous mode (DCM) or a continuous mode by increasing the load of the first output terminal OUT1 which is done by connecting the first output terminal OUT1 to the resistor R.

Referring to FIG. 3, the DC-DC converter 60 further includes a boost circuit 80 and a buck circuit 90, together with the resistor unit 100.

The boost circuit 80, which is a boost converter, generates the first power ELVDD' boosting the input power Vin applied to the input terminal INPUT and outputs the first power ELVDD' to the first output terminal OUT1.

The buck circuit 90, which is a buck converter, generates the second power ELVSS' bucking the input power Vin applied to the input terminal INPUT and outputs the second power ELVSS' to the second output terminal OUT1.

The boost circuit 80 and the buck circuit 90 may be formed to have any suitable configuration as long as they are formed for boosting and bucking voltage and also may use any suitable circuit.

The first power supply ELVDD is a power supply boosting the input power Vin and the second power supply ELVSS is a power supply bucking the input power Vin, such that the first power supply ELVDD supplies voltage larger (higher in voltage level) than the second power ELVSS.

The input power Vin may be transferred from the battery 70 installed in the mobile communication terminal.

In the exemplary embodiment of the present invention, the resistor unit 100 includes a resistor R, a switching element T1, and a comparator 110.

The resistor R is a device having a set or predetermined resistance value, wherein the resistance value may be variously changed according to the experiment or the characteristics of the converter, etc.

The switching element T1 is disposed between the first output terminal OUT1 outputting the first power ELVDD and the resistor R and is on/off controlled by a comparison signals Vcmp transferred from the comparator 110. FIG. 3 shows the case where the switching element T1 is configured as an NOMS type transistor as an exemplary embodiment, but the present invention is not limited thereto.

The comparator 100 compares the input power Vin with reference voltage Vref to perform the on/off control of the switching element T1 through the comparison signal Vcmp.

In more detail, when the input power Vin has voltage larger than the reference voltage Vref, the switching element T1 is turned-on to connect the resistor R to the first output terminal OUT1, and when the input power Vin has voltage lower than the reference voltage Vref, the switching device T1 is turned-off to disconnect the resistor R from the first output terminal OUT1.

Describing the case where the switching device T1 is the NMOS type transistor as an example, the comparator 110 supplies the high-level comparison signal Vcmp to the gate electrode of the transistor when the input power Vin has the voltage larger than the reference voltage Vref, to turn-on the switching element T1, and supplies the low-level comparison signal Vcmp to the gate electrode of the transistor when the input power Vin has voltage lower than the reference voltage Vref, to turn-off the switching element T1.

In this case, the reference voltage Vref that is a comparison reference may be 4.0V. That is, when the input power Vin is fluctuated above 4.0V, the resistor R may be connected to the first output terminal OUT1 by determining the fluctuation of the input power Vin.

FIG. 3 shows the case where the resistor unit 100 of the present invention is installed in the DC-DC converter 60 including both the boost circuit 80 and the buck circuit 90, but the resistor unit 100 according to an embodiment of the present invention may be installed in the DC-DC converter including only the boost circuit 80.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A DC-DC converter for converting an input power to generate a first power and for outputting the first power to a first output terminal, the DC-DC converter comprising:
a resistor unit for electrically connecting a set resistor to the first output terminal when a voltage of the input power is in a specific range,
wherein the resistor unit comprises:
the set resistor;
a switching element between the set resistor and the first output terminal; and
a comparator for turning-on the switching element when the voltage of the input power is larger than a reference voltage, and for turning-off the switching element when the voltage of the input power is lower than the reference voltage.

2. The DC-DC converter according to claim 1, further comprising:
a boost circuit for boosting the input power to generate the first power and for outputting the first power to the first output terminal; and
a buck circuit for bucking the input power to generate a second power and for outputting the second power to a second output terminal.

3. The DC-DC converter according to claim 1, wherein the reference voltage is 4.0V.

4. The DC-DC converter according to claim 1, wherein the input power is transferred from a battery.

5. A mobile communication terminal, comprising:
a display unit for displaying images, the display unit comprising scan lines, data lines crossing the scan lines, and pixels at crossing regions of the scan lines and the data lines, the pixels being connected to both a first power supply and a second power supply;
a scan driver for supplying scan signals to the pixels through the scan lines;
a data driver for supplying data signals to the pixels through the data lines; and
a DC-DC converter for converting an input power to generate a first power of the first power supply and a second power of the second power supply, and for outputting the first power to a first output terminal and the second power to a second output terminal,
wherein the DC-DC converter comprises a resistor unit for electrically connecting a set resistor to the first output terminal when a voltage of the input power is in a specific range, and
wherein the resistor unit comprises:
the set resistor;
a switching element between the set resistor and the first output terminal; and
a comparator for turning-on the switching element when the voltage of the input power is larger than a reference voltage, and for turning-off the switching element when the voltage of the input power is lower than the reference voltage.

6. The mobile communication terminal according to claim 5, wherein the DC-DC converter comprises:
a boost circuit for boosting the input power to generate the first power and for outputting the first power to the first output terminal; and
a buck circuit for bucking the input power to generate the second power and for outputting the second power to the second output terminal.

7. The mobile communication terminal according to claim 5, wherein the reference voltage is 4.0V.

8. The mobile communication terminal according to claim 5, wherein the input power is transferred from a battery.

* * * * *